United States Patent
Dobert et al.

(10) Patent No.: US 8,205,442 B2
(45) Date of Patent: Jun. 26, 2012

(54) LOW RESTRICTION HYDROCARBON TRAP ASSEMBLY

(75) Inventors: Scott Richard Dobert, Dearborn, MI (US); Scott Allen Schaffer, Ypsilanti, MI (US); Anthony C. Arruda, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1015 days.

(21) Appl. No.: 12/134,758

(22) Filed: Jun. 6, 2008

(65) Prior Publication Data

US 2009/0301071 A1    Dec. 10, 2009

(51) Int. Cl.
*F01N 3/022* (2006.01)
*B01D 71/06* (2006.01)

(52) U.S. Cl. .................. 60/311; 123/519; 96/121

(58) Field of Classification Search .......... 96/121; 60/311; 123/519
See application file for complete search history.

(56) References Cited

U.S. PATENT DOCUMENTS

| | | | | |
|---|---|---|---|---|
| 4,418,662 | A | * | 12/1983 | Engler et al. ............... 96/133 |
| 5,125,940 | A | * | 6/1992 | Stanhope et al. ........... 55/385.3 |
| 5,275,636 | A | * | 1/1994 | Dudley et al. .............. 96/421 |
| 5,771,684 | A | * | 6/1998 | Hertl et al. ................ 60/274 |
| 5,787,707 | A | * | 8/1998 | Hertl et al. ................ 60/297 |
| 5,797,973 | A | * | 8/1998 | Dudrey et al. ............. 55/372 |
| 5,914,294 | A | | 6/1999 | Park et al. |
| 5,934,069 | A | * | 8/1999 | Hertl et al. ................ 60/274 |
| 6,171,373 | B1 | | 1/2001 | Park et al. |
| 6,284,705 | B1 | | 9/2001 | Park et al. |
| 6,432,179 | B1 | | 8/2002 | Lobovsky et al. |
| 6,440,200 | B1 | | 8/2002 | Shakibara et al. |
| 6,537,355 | B2 | | 3/2003 | Scardino et al. |
| 6,637,415 | B2 | | 10/2003 | Yoshioka et al. |
| 6,758,885 | B2 | | 7/2004 | Leffel et al. |
| 6,835,234 | B2 | * | 12/2004 | Leffel et al. ............... 96/108 |
| 6,905,536 | B2 | | 6/2005 | Wright |
| 6,997,977 | B2 | | 2/2006 | Dallas et al. |
| 7,056,474 | B2 | | 6/2006 | Dumas et al. |
| 7,128,059 | B2 | | 10/2006 | Phaneuf |
| 7,138,008 | B2 | | 11/2006 | Stenersen et al. |
| 7,163,574 | B2 | | 1/2007 | Bause et al. |
| 7,168,417 | B2 | | 1/2007 | Arruda et al. |
| 7,171,954 | B2 | | 2/2007 | Oda et al. |
| 7,182,802 | B2 | | 2/2007 | Bause et al. |
| 7,213,581 | B2 | | 5/2007 | Burke et al. |
| 7,222,612 | B2 | | 5/2007 | Hagler et al. |

(Continued)

FOREIGN PATENT DOCUMENTS

DE        202005008505         9/2006
(Continued)

*Primary Examiner* — Stephen K Cronin
*Assistant Examiner* — Arnold Castro
(74) *Attorney, Agent, or Firm* — Fraser Clemens Martin & Miller LLC; J. Douglas Miller

(57) ABSTRACT

A hydrocarbon adsorption assembly for an air induction system is disclosed. The hydrocarbon adsorption assembly includes a fluid conduit having an outer surface and a spaced apart inner surface to form a fluid path therein, the conduit including a recessed area formed in the inner surface thereof. A hydrocarbon trap is disposed in the recessed area of the fluid conduit to adsorb hydrocarbons passing through the conduit. The recessed area and the hydrocarbon trap cooperate to cause a portion of an air flowing through the flow path of the conduit to flow through the hydrocarbon trap to facilitate a purging thereof.

15 Claims, 3 Drawing Sheets

U.S. PATENT DOCUMENTS

| | | |
|---|---|---|
| 7,276,098 B2 | 10/2007 | Koslow |
| 7,278,406 B2 | 10/2007 | Hagler |
| 7,294,178 B2 | 11/2007 | Abdolhosseini et al. |
| 7,547,350 B2 * | 6/2009 | Callahan et al. ............ 95/143 |
| 7,763,104 B2 * | 7/2010 | Arruda et al. ............... 96/134 |
| 7,895,983 B2 * | 3/2011 | Braithwaite et al. ..... 123/184.21 |
| 2003/0192512 A1 * | 10/2003 | Luley et al. ............... 123/519 |
| 2004/0099253 A1 | 5/2004 | Tschantz |
| 2005/0279210 A1 | 12/2005 | Hirata |
| 2006/0054142 A1 | 3/2006 | Burke et al. |
| 2006/0150811 A1 | 7/2006 | Callahan et al. |
| 2007/0107701 A1 | 5/2007 | Buelow et al. |
| 2007/0186904 A1 | 8/2007 | Braithwaite et al. |

FOREIGN PATENT DOCUMENTS

JP    2006226123    8/2006

\* cited by examiner

LOW RESTRICTION HYDROCARBON TRAP ASSEMBLY

FIELD OF THE INVENTION

The present invention relates to a hydrocarbon trap assembly and more particularly to a hydrocarbon trap assembly for use in an air induction system of an internal combustion engine.

BACKGROUND OF THE INVENTION

Federal and state environmental laws have established limits on the amount of hydrocarbons that an internal combustion engine for certain vehicles may emit into the atmosphere. To meet these limits, a variety of devices and methods has been developed to measure and control the hydrocarbon emissions from the engine of the vehicle. The engine's air induction system has been observed as a source of hydrocarbons released from the engine to the atmosphere. Accordingly, many of the methods and systems employed to measure and control hydrocarbon emissions are directed to the engine's air induction system and exhaust system.

Hydrocarbons are known to evaporate from the interior of the engine and escape into the atmosphere through the engine's air induction system. The evaporative release of hydrocarbons through the air induction system primarily occurs when the engine is not operating. One method of reducing hydrocarbon emissions through the engine's air induction system is to adsorb or trap hydrocarbons with the use of a filter-like device. Typically, the hydrocarbon-trapping device is disposed in the air induction system, and includes an adsorbent material that adsorbs the hydrocarbons, thus substantially preventing the hydrocarbons from escaping into the atmosphere. When the engine is subsequently caused to operate, air flowing through the air induction system into the engine typically is caused to pass through the hydrocarbon-trapping device. The air passing through the hydrocarbon-trapping device purges the device of the adsorbed hydrocarbons. The purging restores the effectiveness of the hydrocarbon-trapping device for adsorbing hydrocarbons during a subsequent period when the engine is not in operation.

One problem that has plagued engine designers has been in respect of the positioning of the hydrocarbon-trapping device in the air induction system. The position and design of the hydrocarbon-trapping device must minimize an interference and therefore a restriction with the flow of fluid through the air induction system and simultaneously provide for the purging of adsorbed hydrocarbons from the hydrocarbon-trapping device during periods when the engine is in operation.

The prior art has typically provided two distinct solutions to these conflicting operational goals. One solution has been to provide a hydrocarbon-trapping device that occupies the entire cross-section of the flow path of the air induction system. U.S. Pat. No. 7,056,474 to Dumas et al. is illustrative of such a solution. This solution provides effective purging of adsorbed hydrocarbons but interferes with fluid flow through the air induction system during the operation of the engine, which reduces the efficiency and/or power output of the engine.

The alternate solution typically employed is to locate the hydrocarbon-trapping device where it does not substantially interfere with the fluid flow through the main flow path of the air induction system. This solution includes disposing the hydrocarbon-trapping device in a superfluous compartment added to the air induction system, or disposing the hydrocarbon-trapping device as a lining on least a portion of an interior surface of the air induction system. U.S. Pat. Nos. 6,997,977 and 7,182,802 disclose such devices. The problems with these solutions are the separate compartment in the air induction system increases a cost thereof and occupies additional space within an engine compartment of the vehicle; the lining of the air induction system increases a cost thereof; and the purging of hydrocarbons during the operation of the engine is reduced which can cause the trap to become saturated with hydrocarbons significantly reducing its efficiency.

It would be desirable to produce an air induction system for an internal combustion engine including a hydrocarbon-trapping assembly that minimizes an interference with a fluid flow through the air induction system while facilitating a purging of hydrocarbons adsorbed thereby during periods when the engine is in operation.

SUMMARY OF THE INVENTION

Compatible and attuned with the present invention, an air induction system for an internal combustion engine including a hydrocarbon-trapping assembly that minimizes an interference with a fluid flow through the air induction system while facilitating a purging of hydrocarbons adsorbed thereby during periods when the engine is in operation, has surprisingly been discovered.

In one embodiment, a hydrocarbon-trapping assembly comprises a fluid conduit having an outer surface and an inner surface to form a flow path therein, the conduit including a recessed area formed in the inner surface thereof; and a hydrocarbon trap disposed in the recessed area of the fluid conduit having a portion thereof positioned within the flow path of the conduit to optimize a flow of a fluid through the hydrocarbon trap.

In another embodiment, a hydrocarbon-trapping assembly comprises a fluid conduit having an outer surface and an inner surface to form a flow path therein in fluid communication with atmospheric air and an internal combustion engine, the conduit including a recessed area formed in the inner surface thereof having a recess wall; and a hydrocarbon trap having a generally cylindrical shape including an outer surface and a spaced apart inner surface to form a generally centrally located aperture therethrough and disposed in the recessed area of the fluid conduit having the outer surface of the hydrocarbon trap disposed adjacent the recess wall of the recessed area, the hydrocarbon trap including a hydrocarbon adsorbing media substantially surrounded by a gas permeable encapsulating layer, the hydrocarbon trap having a portion thereof positioned within the flow path of the conduit to optimize a flow of a fluid through the hydrocarbon adsorbing material.

In another embodiment, an air induction system for an internal combustion engine comprises a fluid conduit having an outer surface and an inner surface to form a flow path therein in fluid communication with atmospheric air and an internal combustion engine, the conduit including a recessed area formed in the inner surface thereof having a recess wall, and a hydrocarbon trap having a generally cylindrical shape including an outer surface and a spaced apart inner surface to form a generally centrally located aperture therethrough and disposed in the recessed area of the fluid conduit having the outer surface of the hydrocarbon trap disposed adjacent the recess wall of the recessed area, the hydrocarbon trap including a hydrocarbon adsorbing media substantially surrounded by a gas permeable encapsulating layer, the hydrocarbon trap having a portion thereof positioned within the flow path of the conduit to optimize a flow of a fluid through the hydrocarbon adsorbing material.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
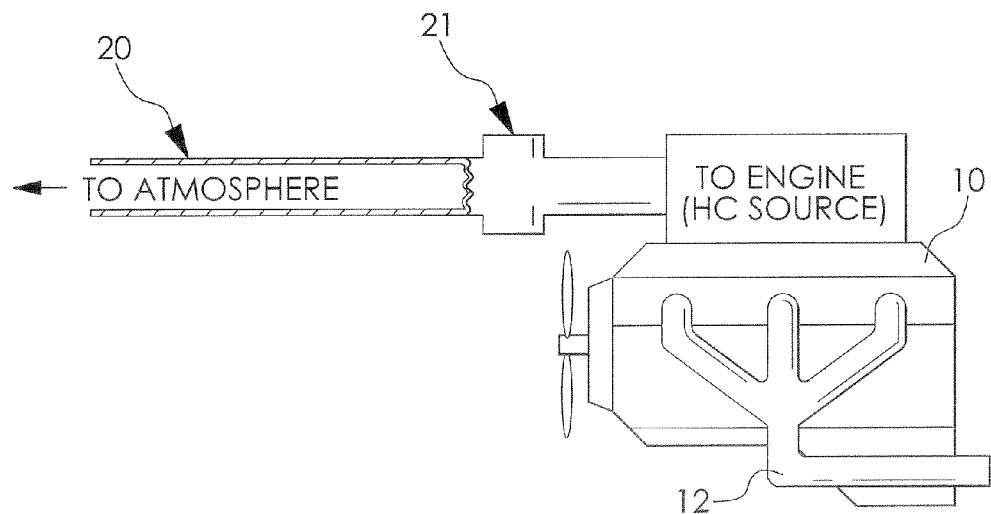
FIG. 1 is a schematic diagram of an internal combustion engine having an air induction system including a hydrocarbon-trapping assembly according to an embodiment of the invention.

FIG. 1 is a schematic illustration of an internal combustion engine 10 having air induction system 20 and an exhaust system 12. The induction system 20 includes a hydrocarbon-trapping assembly 21 with an outlet in fluid communication with the engine 10 and an inlet in fluid communication with the atmosphere. The induction system 20 provides a flow path for atmospheric air to be drawn into the engine 10 where it is combined with a fuel such as gasoline, for example. The air-fuel mixture is then combusted within the engine 10 which forms an exhaust that is expelled from the engine 10 into the atmosphere through the exhaust system 12. It should be understood that the induction system 20 can include one or more air filters (not shown) and one or more sensors (not shown) such as a sensor adapted to monitor the atmospheric air flowing therethrough, for example.

Figure 2:
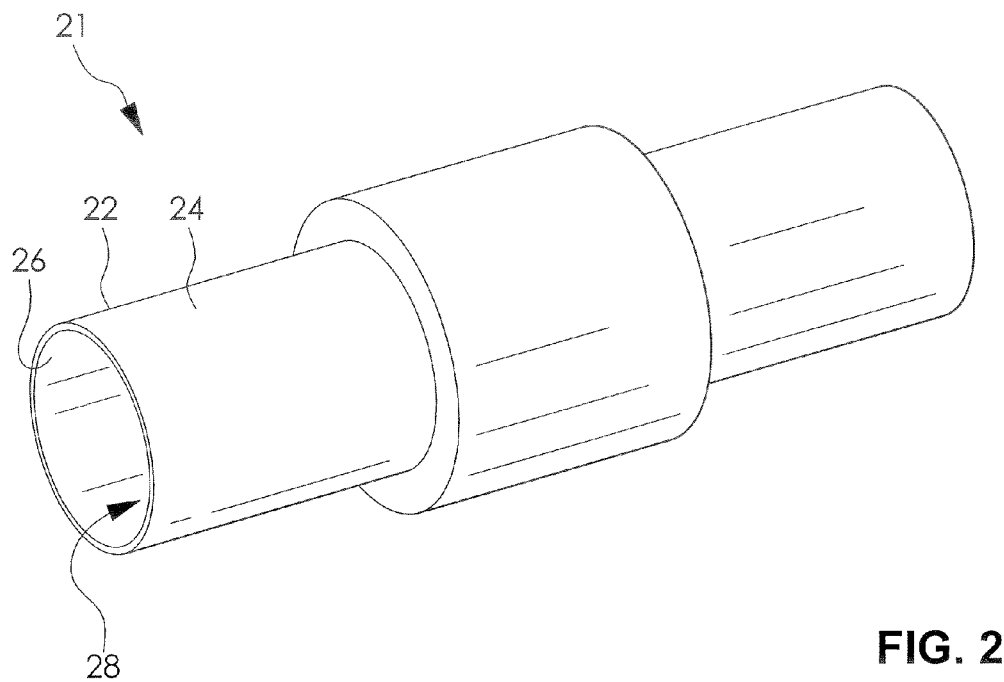
FIG. 2 is a perspective view of a hydrocarbon trap disposed in a fluid conduit of the air induction system illustrated in FIG. 1.
Figure 3:
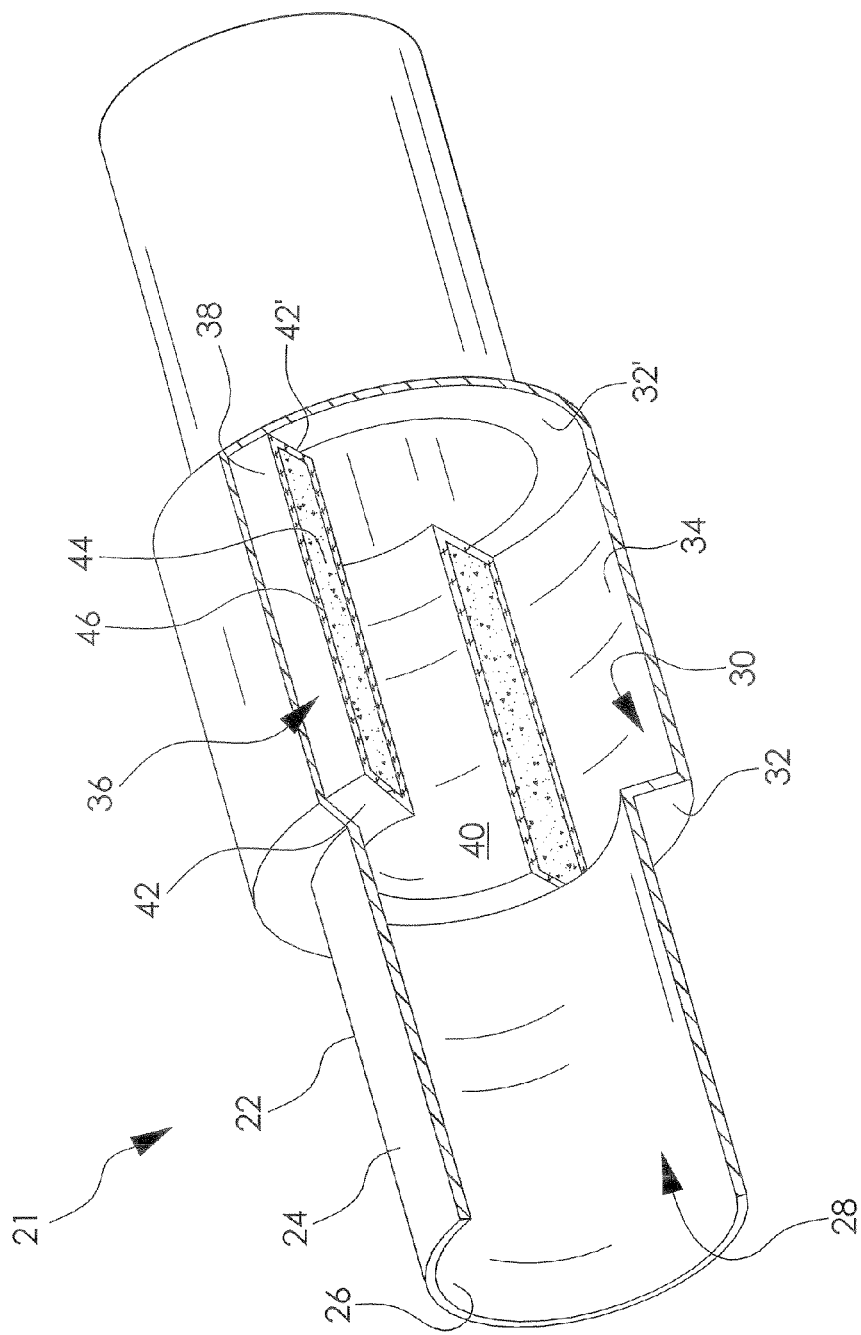
FIG. 3 is a perspective view of the fluid conduit and the hydrocarbon illustrated in FIG. 2 showing a portion thereof in section.

The hydrocarbon-trapping assembly 21, more clearly shown in FIGS. 2-3, includes a fluid conduit 22 and a hydrocarbon trap 36. The conduit 22 has an outer surface 24 and a spaced apart coextensive inner surface 26 forming a flow path 28 therein. In the illustrated embodiment, the conduit 22 has a generally circular cross-sectional shape. However, it should be understood that other cross-sectional shapes may be employed such as an oval, a rectangle, a square, or other suitable shape, for example. Although the conduit 22 is illustrated as being formed as a unitary structure in a generally linear configuration, the conduit 22 can be formed from a plurality of members joined together, and can include one or more bends as necessary. It should be understood that a cross-sectional area and/or a length of the flow path 28 can be adapted to provide a required flow of atmospheric air into the engine 10. Additionally, in the illustrated embodiment, the conduit 22 is formed from a plastic material. However, it should be understood that other materials may be employed to form the conduit 22.

The conduit 22 includes a recessed area 30 formed therein having a generally annular shape. The recessed area 30 includes a pair of spaced apart radially outwardly extending sidewalls 32, 32' and a recess wall 34 disposed therebetween. The recessed area 30 typically forms a corresponding protuberance on the outer surface 24 of the conduit 22. The recessed area 30 has a selected depth to provide an increased diameter of the conduit 22 in the area thereof.

The hydrocarbon trap 36, illustrated in FIG. 3, has a hollow cylindrical shape with a generally circular cross-sectional shape and includes an outer surface 38, a spaced apart inner surface 40, and ends 42, 42'. A generally centrally located aperture extends from the end 42 to the end 42' to facilitate the flow of air therethrough. The trap 36 is disposed in the recessed area 30 of the conduit 22. The outer surface 38 of the trap 36 is secured against the recess wall 34 of the recessed area 30. Additionally, the sidewalls 32, 32' of the recessed area 30 are adapted to cooperate with the respective ends 42, 42' of the trap 36 to facilitate retaining the trap 36 within the recessed area 30. It should be understood that an adhesive or fastener may be employed to further facilitate retaining the trap 36 within the recessed area 30. The conduit 22 can be formed from a pair of members that are joined together adjacent the recessed area 30 to facilitate an installation and/or a removal of the trap 36. Additionally, it should be understood that the trap 36 can have any shape, as desired, provided the trap 36 substantially conforms to the cross-sectional shape of the conduit 22 and the associated recessed area 30, and includes a generally centrally located aperture to facilitate the flow of atmospheric air therethrough.

A distance between the outer surface 38 and the spaced apart inner surface 40 of the trap 36 defines a thickness thereof and a size of the aperture therethrough. The thickness of the trap 36 is selected to cooperate with the depth of the recessed area 30 to position the inner surface 40 radially inwardly in respect of the inner surface 26 of the conduit 22, thus causing the trap 36 to extend into the flow path 28 of the conduit 22.

The hydrocarbon trap 36 is formed from a hydrocarbon adsorbing media 44 substantially surrounded by an encapsulating layer 46. The hydrocarbon adsorbing media 44 can be any media capable of adsorbing hydrocarbon gases including carbon, activated carbon, activated alumina, zeolites, metal oxides, polymer particulates, sodium bisulfate, clays, or silica gels, for example. Favorable results have been obtained by disposing an activated carbon slurry on a substrate formed from an open cell foam, reticulated foam, or reticulated "open cell" polyurethane foam having a thickness of about ten millimeters. The density of the open cell foam is about 1.75 lb./cuft or 794 gms/cuft or 28032 gms/cuM. It should be appreciated that the open cell foam has about 97% porosity, which facilitates airflow. It should be understood that the carbon slurry may be disposed on an open cell foam having other densities or porosities to facilitate achieving a desired airflow therethrough and/or a retention of the carbon slurry. The open cell foam can be folded upon itself to form a desired thickness of the hydrocarbon adsorbing media 44 of the trap 36. Additionally, it should be understood that substrates other than a foam may be employed such as a cloth fabric, a composite fabric, a paper, or a plastic slurry. In the illustrated embodiment, the trap 36 and the recessed area 30 have a substantially constant thickness and depth, respectively. However, it should be understood that the thickness of the trap 36 and/or the depth of the recessed area 30 can be varied to selectively provide additional hydrocarbon adsorbing material 44 at selected positions around the flow path 28 within the conduit 22.

The encapsulating layer 46 is formed from a gas permeable material. The encapsulating layer 46 facilitates maintaining a desired shape of the trap 36, protects the hydrocarbon adsorbing media 44, and militates against any hydrocarbon adsorbing media 44 being released therefrom and being drawn into the air stream. Favorable results have been obtained employing a nylon mesh or a polypropylene material to form the encapsulating layer 46. However, other materials may be used to form the encapsulating layer 46 such as a woven fabric, a non-woven fabric, or a perforated material, for example.

The air induction system 20 typically includes an air filter (not shown) adjacent an end thereof that is open to the atmosphere. The air filter divides the air induction system 20 between a dirty side that is upstream from the air filter and a clean side that is down stream from the air filter (the area between the air filter and the engine 10). It should be understood that the hydrocarbon-trapping assembly 21 may be placed in either the dirty side or the clean side of the air induction system 20. However, favorable results have been obtained by placing the hydrocarbon-trapping assembly 21 in the clean side of the air induction system 20.

In the illustrated embodiment, a single trap 36 is disposed in the conduit 22 of the air induction system 20. However, it should be understood that a conduit 22 having a plurality of recessed areas 30 can be provided, each recessed area 30 having a trap 36 disposed therein. Additionally, the induction system 20 can include a plurality of conduits 22, each conduit 22 selectively including zero, or one or more traps 36 disposed therein.

In use, the hydrocarbon-trapping assembly 21 of the air induction system 20 militates against evaporating hydrocarbons from being released from the engine 10 during periods when the engine 10 is not operating. The evaporating hydrocarbons enter the conduit 22 and flow to the area adjacent the trap 36. The evaporating hydrocarbons pass through the encapsulating layer 46 of the trap 36 and are adsorbed by the hydrocarbon adsorbing media 44 therein, thus militating against the evaporating hydrocarbons from escaping through the induction system 20 to the atmosphere.

When the engine 10 is in operation, atmospheric air is drawn through the conduit 22 into the engine 10. The trap 36 extends into the flow path 28 causing at least a portion of the incoming atmospheric air to flow through the trap 36 prior to entering the engine 10. The atmospheric air flowing through the trap 36 during the operation of the engine 10 substantially purges the trap 36 of hydrocarbons adsorbed during the period the engine 10 was not in operation.

The extension of the trap 36 into the flow path 28 facilitates the purging of the trap 36 and militates against the trap 36 from becoming saturated with hydrocarbons. The purging of the trap 36 also maximizes a life thereof. Additionally, the extension of the trap 36 into the flow path 28 is optimized to facilitate the purging of the trap 36, while also minimizing an interference with the flow of atmospheric air into the engine 10.

The hydrocarbon-trapping assembly 21 minimizes a cost of the air induction system 20 by eliminating superfluous compartments and/or conduits typically employed to house a hydrocarbon trap in prior art air induction systems. Additionally, by eliminating superfluous compartments and/or conduits, the space occupied by the air induction system 20 is minimized.

Figure 4:
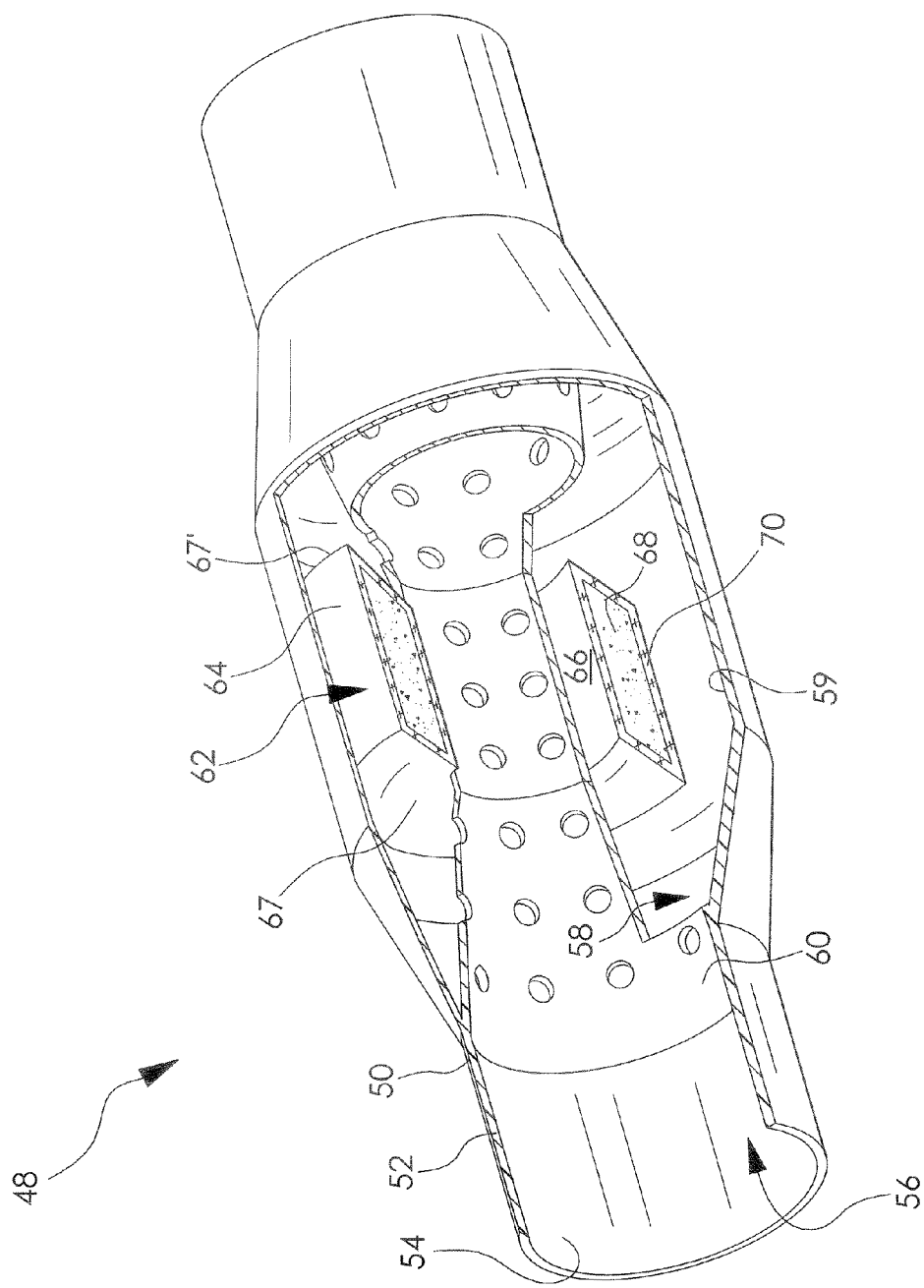
FIG. 4 is a perspective view of a fluid conduit and a hydrocarbon trap showing a portion thereof in section according to another embodiment of the invention.

FIG. 4 illustrates a hydrocarbon-trapping assembly 48 according to another embodiment of the invention. The hydrocarbon-trapping assembly 48 includes a fluid conduit 50 and a hydrocarbon trap 62. The conduit 50 has an outer surface 52 and a spaced apart coextensive inner surface 54 forming a flow path 56 therein. In the illustrated embodiment, the conduit 50 has a generally circular cross-sectional shape. However, it should be understood that other cross-sectional shapes may be employed such as an oval, a rectangle, a square, or other suitable shape, for example. Although the conduit 50 is illustrated as being formed as a unitary structure in a generally linear configuration, the conduit 50 can be formed from a plurality of members joined together, and can include one or more bends as necessary. It should be understood that a cross-sectional area and/or a length of the flow path 56 can be adapted to provide a required flow of atmospheric air into the engine 10. Additionally, in the illustrated embodiment, the conduit 50 is formed from a plastic material. However, it should be understood that other materials may be employed to form the conduit 50.

The conduit 50 includes a recessed area 58 formed therein having a generally annular shape and including a recess wall 59. The recessed area 58 has a selected depth to provide an increased diameter of the conduit 50 in the area thereof, and/or an increased internal volume to the conduit 50 in the area thereof. The depth, volume, and shape of the recessed area 58 are selected to tune the induction system 20 to maximize the flow of atmospheric air therethrough. The recessed area 58 adapted to tune the induction system 20 is commonly referred to as an acoustic chamber or an expansion chamber.

A perforated member 60 is provided that spans the recessed area 58 adapted to facilitate a flow of air through recessed area 58. It should be understood that the perforated member 60 can be secured to the inner surface 54 by employing an adhesive, a mechanical fastener, or a weld, for example. Additionally, it should be understood that the perforated member 60 can be formed integral with the internal surface 54 of conduit 50.

The hydrocarbon trap 62 has a hollow cylindrical shape with a generally circular cross-sectional shape and includes an outer surface 64 and a spaced apart inner surface 66, and ends 67, 67'. A generally centrally located aperture extends from the end 67 to the end 67' to facilitate the flow of air therethrough. The trap 62 is disposed in the recessed area 58 and secured between the recess wall 59 of the recessed area 58 and the perforated member 60. It should be understood that an adhesive or fastener may be employed to facilitate retaining the trap 62 at a desired location within the recessed area 58. Additionally, the recessed area 58 can include other means such as a pair of cooperating walls, for example, to further facilitate retaining the trap 62 at a desired location within the recessed area 58. The conduit 50 can be formed from a pair of members that are joined together adjacent the recessed area 58 to facilitate an installation and/or a removal of the trap 62. Additionally, it should be understood that the trap 62 can have any shape, as desired, provided the trap 62 substantially conforms to the cross-sectional shape of the conduit 50 and the associated recessed area 58, and includes a generally centrally located aperture to facilitate the flow of atmospheric air therethrough.

A distance between the outer surface 64 and the spaced apart inner surface 66 of the trap 62 defines a thickness thereof. The thickness of the trap 62 is selected to cooperate with the depth of the recessed area 58 and the perforated member 60 to position the inner surface 66 of the trap 62 radially inwardly in respect of the inner surface 54 of the conduit.

The hydrocarbon trap 62 is formed from a hydrocarbon adsorbing media 68 substantially surrounded by an encapsulating layer 70. The hydrocarbon adsorbing media 68 can be any media capable of adsorbing hydrocarbon gases including carbon, activated carbon, activated alumina, zeolites, metal oxides, polymer particulates, sodium bisulfate, clays, or silica gels, for example. Favorable results have been obtained by disposing an activated carbon slurry on a substrate formed from an open cell foam, reticulated foam, or reticulated "open cell" polyurethane foam having a thickness of about ten millimeters. The density of the open cell foam is about 1.75 lb./cuft or 794 gms/cuft or 28032 gms/cuM. It should be appreciated that the open cell foam has about 97% porosity, which facilitates airflow. It should be understood that the carbon slurry may be disposed on an open cell foam having other densities or porosities to facilitate achieving a desired airflow therethrough and/or a retention of the carbon slurry. The open cell foam can be folded upon itself to form a desired thickness of the hydrocarbon adsorbing media 68 of the trap 62. Additionally, it should be understood that substrates other than a foam may be employed such as a cloth fabric, a composite fabric, a paper, or a plastic slurry. In the illustrated embodiment, the trap 62 and the recessed area 58 have a substantially constant thickness and depth, respectively. However, it should be understood that the thickness of the trap 62 and the depth of the recessed area 58 can be varied to selectively provide additional hydrocarbon adsorbing material 68 at selected positions around the flow path 56 within the conduit 50.

The encapsulating layer 70 is formed from a gas permeable material. The encapsulating layer 70 facilitates maintaining a desired shape of the trap 62, protects the hydrocarbon adsorbing media 68, and militates against any hydrocarbon adsorbing media 68 from being released therefrom and being drawn into the air stream. Favorable results have been obtained employing a nylon mesh or a polypropylene material to form the encapsulating layer 70. However, other materials may be used to form the encapsulating layer 70 such as a fabric, a woven fabric, a non-woven fabric, or a perforated material, for example.

The air induction system 20 typically includes an air filter (not shown) adjacent an end thereof that is open to the atmosphere. The air filter divides the air induction system 20 between a dirty side that is upstream from the air filter and a clean side that is down stream from the air filter (the area between the air filter and the engine 10). It should be understood that the hydrocarbon-trapping assembly 48 may be placed in either the dirty side or the clean side of the air induction system 20. However, favorable results have been obtained by placing the hydrocarbon-trapping assembly 48 in the clean side of the air induction system 20.

In the illustrated embodiment, a single trap 62 is disposed in the recessed area 58 of the conduit 50 of the air induction system 20. However, it should be understood that a plurality of traps 62 can be disposed within the recessed area 58. Additionally, the induction system 20 can include a plurality of conduits 50 including one or more recessed area 58, each recessed area 58 having a selected number of traps 62 including zero, or one or more traps 62.

In use, the hydrocarbon-trapping assembly 48 of the air induction system 20 operates in a substantially similar manner as the hydrocarbon-trapping assembly 21, described herein, to adsorb hydrocarbons evaporating from the engine 10 through the induction system 20 during periods when the engine 10 is not operating. When the engine 10 is in operation, atmospheric air is drawn through the conduit 50 into the engine 10. The trap 62 extends into the flow path 56 causing at least a portion of the incoming atmospheric air to flow through the trap 36 prior to entering the engine 10. Additionally, the recessed area 58 and the perforated member 60 cause the atmospheric air flowing in the recessed area 58 and through the trap 62 to have a turbulent flow. The atmospheric air flowing through the trap 62 during the operation of the engine 10 substantially purges the trap 62 of hydrocarbons adsorbed during the period the engine 10 was not in operation. The turbulent flow of the atmospheric air flowing in the recessed area 58 further facilitates the purging of the trap 62.

The positioning of a portion of the trap 62 in the flow path 56 and in the turbulent flow of air within the recessed area 58 facilitates the purging of the trap 62 of any hydrocarbons adsorbed therein and militates against the trap 62 from becoming saturated with hydrocarbons. The purging of the trap 62 also maximizes a life thereof. Additionally, the extension of the trap 62 into the flow path 56 is optimized to facilitate the purging of the trap 62, while also minimizing an interference with the flow of atmospheric air into the engine 10.

The hydrocarbon-trapping assembly 48 minimizes a cost of the air induction system 20 by eliminating superfluous compartments and/or conduits typically employed to house a hydrocarbon trap in prior art air induction systems. Additionally, by eliminating superfluous compartments and/or conduits, the space occupied by the air induction system 20 is minimized. Further, disposing the trap 62 in the recessed area 58 adapted to be an acoustic chamber or an expansion chamber minimizes a cost of the air induction system 20 and the space occupied by the air induction system 20.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A hydrocarbon trapping assembly comprising:
a fluid conduit having an outer surface and an inner surface to form a flow path therein, the fluid conduit including a recessed area formed in the inner surface thereof; and
a hydrocarbon trap disposed in the recessed area of the fluid conduit having a portion thereof positioned within the flow path of the fluid conduit to optimize a flow of a fluid through the hydrocarbon trap, wherein the hydrocarbon trap includes a hydrocarbon adsorbing media substantially surrounded by an encapsulating layer, and wherein opposing surfaces of the hydrocarbon trap abut features of the fluid conduit defining the recessed area of the hydrocarbon trapping assembly to secure the hydrocarbon trap within the recessed area.

2. The hydrocarbon trapping assembly according to claim 1, wherein the recessed area has a generally annular shape and includes a recess wall.

3. The hydrocarbon trapping assembly according to claim 2, wherein the hydrocarbon trap has a generally cylindrical shape including an outer surface and an inner surface to form a generally centrally located aperture therethrough.

4. The hydrocarbon trapping assembly according to claim 3, wherein the outer surface of the hydrocarbon trap is disposed adjacent the recess wall of the recessed area.

5. The hydrocarbon trapping assembly according to claim 2, wherein the recessed area includes a pair of spaced apart radially extending sidewalls having the recess wall disposed therebetween.

6. The hydrocarbon trapping assembly according to claim 5, wherein the spaced apart radially extending sidewalls are the features of the fluid conduit defining the recessed area of the hydrocarbon trapping assembly.

7. The hydrocarbon trapping assembly according to claim 2, including a perforated member disposed on the inner surface of the conduit and substantially spanning the recessed area therein positioning the hydrocarbon trap between the recess wall of the recessed area and the perforated member.

8. The hydrocarbon trapping assembly according to claim 7, wherein the recess wall of the recessed area and the perforated member are the features of the fluid conduit defining the recessed area of the hydrocarbon trapping assembly.

9. The hydrocarbon trapping assembly according to claim 1, wherein the hydrocarbon adsorbing media includes at least one of a carbon, an activated carbon, an activated alumina, a zeolite, a metal oxide, a polymer particulate, a sodium bisulfate, a clay, and a silica gel.

10. The hydrocarbon trapping assembly according to claim 1, wherein the hydrocarbon adsorbing media is disposed on a substrate.

11. The hydrocarbon trapping assembly according to claim 10, wherein the substrate is one of a foam, a cloth fabric, a composite fabric, a paper, or a plastic slurry.

12. The hydrocarbon trapping assembly according to claim 1, wherein the encapsulating layer is a gas permeable layer.

13. A hydrocarbon trapping assembly comprising:
a fluid conduit having an outer surface and an inner surface to form a flow path therein, the fluid conduit including a generally annular recessed area formed in the inner surface thereof, the recessed area having a recess wall; and
a hydrocarbon trap having a generally cylindrical shape disposed in the recessed area of the fluid conduit, the hydrocarbon trap including an outer surface, an inner surface, and a generally centrally located aperture formed therein, wherein the outer surface of the hydrocarbon trap is disposed adjacent the recess wall of the recessed area, the hydrocarbon trap further including a hydrocarbon adsorbing media substantially surrounded by a gas permeable encapsulating layer, wherein a portion of the hydrocarbon trap is positioned within the flow path of the fluid conduit to optimize a flow of a fluid through the hydrocarbon adsorbing media.

14. The hydrocarbon trapping assembly according to claim 13, wherein the recessed area includes a pair of spaced apart radially extending sidewalls having the recess wall disposed therebetween, the sidewalls adapted to facilitate securing the hydrocarbon trap within the recessed area.

15. The hydrocarbon trapping assembly according to claim 13, including a perforated member disposed on the inner surface of the fluid conduit, the perforated member substantially spanning the recessed area therein, wherein the hydrocarbon trap is positioned between the recess wall of the recessed area and the perforated member.

* * * * *